US011337430B2

(12) United States Patent
Knodel et al.

(10) Patent No.: US 11,337,430 B2
(45) Date of Patent: May 24, 2022

(54) DEVICE AND PROCEDURE FOR PROCESSING A FOODSTUFF MATERIAL

(71) Applicants: VEMAG Maschinenbau GmbH, Verden/Aller (DE); Freddy Hirsch Group AG, Hunenberg (CH)

(72) Inventors: Peter Knodel, Oyten (DE); Mitja Wagner, Verden (DE); Fritjof Wesemann, Achim (DE); Johann Walger, Langwedel (DE); Oliver Brecht, Eystrup (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 17/144,297

(22) Filed: Jan. 8, 2021

(65) Prior Publication Data

US 2021/0212328 A1 Jul. 15, 2021

(30) Foreign Application Priority Data

Jan. 9, 2020 (EP) .................................... 20151030

(51) Int. Cl.
*A22C 11/00* (2006.01)
*A22C 11/02* (2006.01)
(Continued)

(52) U.S. Cl.
CPC ...... *A22C 11/0227* (2013.01); *A22C 13/0003* (2013.01); *A23L 13/65* (2016.08)

(58) Field of Classification Search
CPC ............ A22C 11/0209; A22C 11/0227; A22C 13/0003; A32L 13/65
(Continued)

(56) References Cited

U.S. PATENT DOCUMENTS 3,949,446 A * 4/1976 Smith ................ A22C 11/0209
452/38
6,379,733 B2 4/2002 Matthews et al.
(Continued)

FOREIGN PATENT DOCUMENTS

DE 69803233 T2 7/2002
DE 69814665 T2 11/2003
(Continued)

OTHER PUBLICATIONS

International Searching Authority, Search Report and Written Opinion issued in PCT/EP2021/050388 dated May 3, 2021 (14 pages), provided to show citations only.

*Primary Examiner* — Richard T Price, Jr.
(74) *Attorney, Agent, or Firm* — Wood Herron & Evans LLP

(57) ABSTRACT

An apparatus for processing a foodstuff material is provided, specifically for producing sausage products from sausage meat. The apparatus includes a stationary housing which has a wall and which can be connected in fluid-conducting relationship to a conveyor pump, and has a discharge opening for delivery of the foodstuff material. Arranged within the housing is an element for partially swirling the foodstuff material within the housing, which is rotatable relative to the wall and along which in operation at least a partial amount of the foodstuff material to be conveyed flows. The rotatable element ends within the housing before the discharge opening for delivery of the foodstuff material. The apparatus can produce a string with a substantially cylindrical outer contour from a foodstuff material like sausage meat.

16 Claims, 6 Drawing Sheets

(51) Int. Cl.
    *A23L 13/60*     (2016.01)
    *A22C 13/00*     (2006.01)

(58) Field of Classification Search
    USPC .......................................................... 452/32
    See application file for complete search history.

(56) References Cited

U.S. PATENT DOCUMENTS

| | | |
|---|---|---|
| 6,988,943 B2 | 1/2006 | Reutter et al. |
| 7,144,316 B1 | 12/2006 | Chen |

FOREIGN PATENT DOCUMENTS

| | | | |
|---|---|---|---|
| EP | 1371293 | A1 | 12/2003 |
| FR | 1133446 | A | 3/1957 |
| WO | 9922600 | A1 | 5/1999 |

\* cited by examiner

DEVICE AND PROCEDURE FOR PROCESSING A FOODSTUFF MATERIAL

CROSS-REFERENCE TO RELATED APPLICATION

This application claims priority to European Patent Application No. 20151030.2, filed Jan. 9, 2020. The above-mentioned patent application is incorporated herein by reference in its entirety.

TECHNICAL FIELD

This application relates to an apparatus for processing a foodstuff material, in particular for producing sausage products from sausage meat, including a stationary housing which has a wall and which can be connected in fluid-conducting relationship to a conveyor pump, and which has a discharge opening for delivery of the foodstuff material.

In addition, this application also relates to a machine for producing a string from a foodstuff material and a method of producing a string of a foodstuff material.

BACKGROUND

Apparatuses and methods of the above-indicated general kind are usually employed for the production of strings of sausages. In particular such apparatuses are used to preferably substantially continuously produce strings of sausages of a substantially cylindrical outside contour and with a casing material applied to the outside of the string. The foodstuff material, in particular the sausage meat, is usually held in readiness in a filling hopper of a manufacturing machine for sausages and is conveyed by a conveyor pump for generating a continuous conveyor flow of the foodstuff material in the direction of a discharge opening of a housing which in particular has a fixed wall.

Instead of introducing the foodstuff material into a casing like for example a synthetic or natural skin it is possible for an initially flowable casing material which later hardens also to be applied to the outside of the foodstuff material. The casing material also protects the foodstuff material from hygiene points of view and imparts increased strength to the string of foodstuff material produced, whereby an unwanted break in the string is to be avoided or made less likely. By way of example collegen or alginate is used as the casing material for application to the surface of the string produced. Collegen and alginate are flowable casing materials which after application to the string surface solidify after a relatively short time and form a strong case on the foodstuff material string.

In a subsequent processing operation which follows production of the sausage string produced from the foodstuff material, in particular in a cooking process, shrinkage of the sausage string can occur, primarily in the longitudinal direction of the sausages produced. Accordingly the sausages produced shrink during the cooking process in over-proportional relationship in their length. The over-proportional shrinkage in the longitudinal direction (also known as longitudinal shrinkage) is principally to be attributed to the orientation of the structure of the processed foodstuff material, in particular the orientation of the fibers in the foodstuff material, preferably the sausage meat to be processed. In comparison with the foodstuff material the casing material enclosing the foodstuff material string or the individual string portions does not shrink or shrinks only very slightly. Therefore the finished string portions or sausages can have an unwanted wavy or wrinkly surface after having passed through a cooking process. In addition, at the same time as the reduction in the length of the string or the sausages in the longitudinal direction, there can be an increase in diameter so that overall that results in unwanted dimensional deviations in the sausages. As a result the sausages produced frequently present an external appearance which is unattractive for the end consumer.

Therefore, it would be desirable to provide an apparatus or machine and a method of processing a foodstuff material, with which it is possible to influence the shrinkage behaviour of the produced sausages in the longitudinal direction in a cooking process which follows the production process.

SUMMARY

According to embodiments of the present invention, the technical objects identified above are achieved by an apparatus where arranged within the housing thereof is an element for partially swirling the foodstuff material within the housing, which is rotatable relative to the wall and along which in operation at least a partial amount of the foodstuff material to be conveyed flows, and wherein the rotatable element ends within the housing before the discharge opening for delivery of the foodstuff material. The rotatable element therefore does not extend in the direction of its longitudinal axis as far as the discharge opening of the housing, but maintains a spacing relative thereto. Preferably a partial space is provided within the housing between the end of the rotatable element and the discharge opening. In operation the foodstuff material flows into that space which is preferably somewhat enlarged, and the foodstuff material is then influenced less or is no longer influenced by the rotation of the rotatable element.

According to the invention the approach adopted is that the foodstuff material—in the partial space—is at least somewhat swirled around with the rotating element within the housing, before reaching the discharge opening for delivery of the foodstuff material. That affords a less homogenous orientation of any fibers in the foodstuff material. In contrast to the apparatuses known from the state of the art, according to the invention it is provided that the foodstuff material, with delivery from the discharge opening, is no longer oriented with its fibers primarily in the longitudinal direction of the string produced or the direction in which the string extends. Rather, the fibers present an at least more strongly undirected orientation or a deviation in their fiber orientation relative to the longitudinal direction. According to the invention the foodstuff material, in respect of its fiber orientation, is of a non-homogenous structure. This provides that the sausage shrinks more uniformly in the direction in which it extends longitudinally and transversely. In addition the casing suffers from a lesser degree of waviness or wrinkling. Overall the appearance and the dimensional accuracy of the sausage is improved. To this end, the apparatus can produce a string with a substantially cylindrical outer contour from a foodstuff material like sausage meat.

According to a preferred embodiment of the apparatus according to the invention the spacing between the discharge opening of the housing and an outlet or end of the rotatable element is in the range of >0 through about 100 mm, preferably in the range of >0 through about 50 mm and/or the rotatable element is arranged concentrically within the housing. By virtue of the spacing between the discharge opening at the stationary housing and the outlet or end of the element within the limits specified according to the invention preferably thorough mixing and/or swirling or differing orientation of the fibers relative to the longitudinal axis of the string or string portion of the foodstuff material, that is to be produced, is achieved. In that respect the size of the spacing between the discharge opening of the housing and the outlet or end on the element—forming a partial space within the housing before the discharge opening—can be varied. The size of the spacing also varies in dependence on on the dimensions in the diameter of the housing and the rotatable element arranged therein. If the diameter of the housing and the rotatable element on the apparatus according to the invention increases, it is preferred for the spacing between the discharge opening and the outlet or end to be selected to be greater to achieve desired swirling action of the fibers in the foodstuff material. Preferably the diameter of the partial space decreases in a conical configuration along a portion of that space. In an embodiment of the invention therefore the discharge opening on the stationary housing is smaller than the diameter of the partial space of the stationary housing in the transitional region from the outlet or end of the rotatable element into the partial space.

In a preferred development of the present invention the rotatable element is arranged concentrically within the stationary housing. The preferably uniform spacing from the outer peripheral surface to the inside of the stationary housing along the entire periphery of the string of foodstuff material, that flows along the rotatable element, also provides for preferably uniform swirling of the fibers within the foodstuff material.

The rotatable element can preferably be set in rotation by a drive unit and is adapted to additionally move at least a partial amount of the foodstuff material to be conveyed when flowing through the housing in the longitudinal direction in a movement with at least one rotational movement component relative to the longitudinal axis of the housing. Preferably the part of the foodstuff material that is disposed in the operative region of the rotatable element is moved by a given angular amount relative to the part of the foodstuff material, that has immediately before left the operative region of the rotatable element. In particular the part of the foodstuff material, that is in the operative region of the rotatable element, is constantly swirled or rotated, thereby providing a continuous change in the structure, in particular the orientation of the fibers, of the foodstuff material. Preferably the rotatable element is continuously or discontinuously set in rotation by the drive unit, wherein at the same time the foodstuff material continues to be conveyed in the longitudinal direction of the feed tube and the stationary housing by a conveyor pressure acting within the feed tube and/or the stationary housing. By the swirling or rotation of the foodstuff material which has left the outlet or the end of the rotatable element, in particular in the transition between the outlet or end of the element and the downstream portion on the stationary housing, by virtue of the relative movement of the element and the housing relative to each other, there is a movement of the foodstuff material with at least a rotational movement component relative to the longitudinal axis of the housing. Preferably the fibers of the foodstuff material which is conveyed through the housing and the feed tube are at least partially oriented in the peripheral direction of the string or string portions produced.

A development of the apparatus according to the invention provides that the rotatable element is adapted to orient substantially in a spiral shape the structure of the foodstuff material flowing in the portion of the housing between its discharge opening and the outlet or the end of the rotatable element by virtue of the relative movement between the feed tube and the stationary housing. By virtue of the mutually superposed rotation of the rotatable element relative to the wall of the housing and the conveyor movement of the foodstuff material in the longitudinal direction thereof in particular the fibers within the foodstuff material, with the transition into the fixed part of the housing, are oriented non-homogenously, in particular approximately in a spiral form around the longitudinal axis of the produced string or string portions. In a cooking process following production of the string portions from the foodstuff material, due to the preferably spiral orientation of the fibers within the string portions, the shrinkage behaviour of each string portion in the longitudinal direction and preferably the cross-sectional dimensions thereof are influenced. With the non-homogenous, in particular spirally oriented fibers, shrinkage of the string portions in the longitudinal direction is limited to a predetermined ratio. Preferably the ratio between the final length occurring after the cooking process and the starting length of the string portion prior to the cooking process is at >0.85, preferably >0.92. In addition, with the in particular spiral orientation of the fibers within the foodstuff material, instead of an increase in the diameter of the string portions, a slight reduction is achieved. The string portions which are produced and cooked therefore present an appearance which is attractive to the eye in comparison with conventionally produced and/or further processed string portions.

Preferably the rotatable element is a rotatably feed tube which ends within the housing before the discharge opening for delivery of the foodstuff material and through which in operation at least a partial amount of the foodstuff material to be conveyed flows. The foodstuff material thus flows in the interior along the feed tube. A change in the fiber orientation relative to the foodstuff material conveyor direction is implemented by discharge of the foodstuff material from the feed tube into the stationary housing into the partial space in front of the discharge opening and because of the preferably constant relative movement between the rotating feed tube and the housing. The structure of the foodstuff material, in particular the fiber orientation, extends less parallel to the conveyor direction of the foodstuff material. The issue of the foodstuff material from the rotatable feed tube into the partial space in the housing before the discharge opening for delivery of the foodstuff material from the housing provides for re-orientation of the structure of fibers of the foodstuff material while still within the housing, so that any fibers within the foodstuff material are more greatly distributed and are less homogenously oriented. In particular in a cooking process following the production step, the shrinkage behaviour in the longitudinal direction, by virtue of the altered less homogenous orientation of the fibers within the produced string or the individual string portions, is less than in the case of a string portion with fibers which extend more greatly or even exclusively in the longitudinal direction. In addition the altered or unordered orientation of the fibers in the foodstuff material string advantageously counteracts an increase in the cross-section of the string portions. Overall the appearance and geometrical size of the sausage is improved. Unwanted waviness in the casing is reduced.

Preferably in operation of the apparatus the foodstuff material flows coaxially both through the rotatable feed tube and also through a substantially annular passage provided between the feed tube and the housing. By the annular passage around the feed tube preferably a kind of double-layer product is produced. String portions produced preferably comprise a core consisting of the foodstuff material with fibers which are oriented in an altered state with respect to the longitudinal direction of the string portion, and the casing which surrounds the core and which comprises the foodstuff material, the fibers of which extend substantially in the longitudinal direction. Such a configuration makes it possible for the shrinkage characteristic of the sausages or string portions to be produced to be influenced in specifically targeted fashion. In particular by altering or adjusting the thickness of the casing which surrounds the core and comprises the foodstuff material with fibers extending substantially in the longitudinal direction, it is possible specifically to influence the shrinkage of the string portions in the longitudinal direction in a subsequent cooking process.

Preferably in an embodiment the annular passage surrounding the feed tube is adjustable. That can be effected for example by inserting a bush or sleeve which bears against the inside of the stationary housing and extends along a portion of the housing. Preferably the inside diameter of the housing relative to the outside diameter of the rotatable feed tube is in a ratio in the range of >1 through about 2. In an embodiment in which the ratio between the inside diameter of the housing and the outside diameter of the feed tube is only a little larger than 1 there is no annular gap, through which a part of the foodstuff material to be conveyed would flow. The foodstuff material to be conveyed thus flows exclusively through the feed tube which is rotatable relative to the housing.

In a further embodiment the outside diameter of the feed tube can be half as great as the inside diameter of the housing. The ratio between the housing inside diameter and the feed tube outside diameter can preferably be selected as desired in the above-indicated limits. In that way the thickness dimensions of the "double-layer" product of the string portions to be produced can be adapted to achieve the desired shrinkage behaviour in the longitudinal direction and in the thickness direction.

According to an alternative configuration of the present invention the rotatable element is a swirling means which is arranged rotatably within a stationary feed tube and along which in operation the foodstuff material flows. Instead of a rotatable feed tube, within which the foodstuff material is conveyed, the foodstuff material now flows externally along and around the rotatable swirling means. Preferably the swirling means is in the form of a rotating spiral arranged on a rotatable bar element which in turn projects into a now fixed feed tube as a stationary housing. Similarly to the outlet at the rotatable feed tube the swirling means has an end which terminates before the discharge opening of the stationary housing.

In a preferred embodiment the stationary housing at least portion-wise is provided by a rigidly mounted feed tube for the foodstuff material. The swirling means can have one or more helical coils or paddles on a rotating bar element, by which the foodstuff material is swirled within the stationary housing, in the present case the feed tube. In the fixed tube the swirling means is of a diameter which is slightly less than the inside diameter of the feed tube. In particular when moving along the swirling means, that is to say in the longitudinal direction thereof, the foodstuff material is caused to move with at least a rotational movement component, preferably in a spiral movement relative to the longitudinal axis of the swirling means and thus the stationary housing.

According to a preferred development the housing has a portion with a flow cross-section decreasing in the conveyor direction of the foodstuff material and/or the feed tube within the stationary housing is of a substantially constant flow cross-section. By the reducing flow cross-section in the stationary housing, an accelerated conveyor movement is achieved in respect of the partial flow of the foodstuff material, that flows externally around the feed tube, or the foodstuff material which flows externally around the swirling means. In particular the influence of the partial amount of the foodstuff material, that is conveyed externally around the feed tube, on the properties of the string portions produced can be adapted. The feed tube itself preferably is of a uniform cross-section over its entire length. The stationary housing in a preferred embodiment is in the form of a conveyor conduit for the foodstuff material.

It is further preferably provided according to the invention that the rotatable element is coupled to a a drive unit which is adapted to displace the rotatable element preferably in a continuously or step-wise adjustable rotary movement. Preferably the rotary movement of the rotatable element, in particular the feed tube or the swirling means, can be altered in the relationship with the conveyor movement of the foodstuff material conveyed through the feed tube. In that way the orientation of the fibers within the foodstuff material can be varied and the shrinkage behaviour of the foodstuff material overall or a string portion produced from the foodstuff material can be influenced. Preferably the drive device coupled to the rotatable element is connected in signal-conducting relationship to a control device, by which preferably the conveyor movement of the foodstuff material within the rotatable or stationary feed tube can also be simultaneously regulated by a conveyor pump actuated by the control device. The drive unit preferably has a drive element which preferably cooperates with the rotatably mounted feed tube by way of a spur gear transmission.

According to a preferred development the housing cooperates with an extrusion head for the delivery of a string of the foodstuff material, wherein the extrusion head is preferably in the form of a co-extrusion head for delivery of the foodstuff material and a casing material surrounding the foodstuff material. Preferably the foodstuff material is delivered in particular in the form of a continuously issuing string at the discharge opening of the stationary housing. The end of the stationary housing is thus in the form of an extrusion head. In a preferred configuration the extrusion head is a co-extrusion head. Besides the foodstuff material which is in the form of a continuously delivered string in addition a casing material is discharged, which upon delivery from the extrusion head is preferably applied to the outside of the string of the foodstuff material. The casing material preferably surrounds the issuing foodstuff material over its full periphery.

Preferably the co-extrusion head is supported stationarily by a machine frame and has a receiving chamber for the flowable, preferably hardenable casing material, in particular alginate or collagen. The fact that the co-extrusion head is stationarily supported provides in particular the fixed configuration of the housing, within which orientation of the fibers of the foodstuff material to be conveyed is achieved, with the orientation thereof that differs from the longitudinal direction or conveyor direction of the foodstuff material. The co-extrusion head has at least one receiving chamber for the flowable casing material, from which the casing material is applied directly to the outside surface of the string produced from the foodstuff material. The alginate or collegen preferably used for encasing the string has the property of hardening after a relatively short time and thus imparting increased strength to the surface of the string. That counteracts unwanted subdivision of the string of foodstuff material that is created.

Preferably the receiving chamber has an outlet opening which is preferably associated with the discharge opening of the housing so that the flowable casing material is delivered from the outlet opening directly on to the surface of the foodstuff material string. That preferably involves direct application of the casing material to the outer surface of the string produced, whereby a firm join is achieved between the outer surface and the casing material. The outlet opening extends at least region-wise along the outer surface of the string of foodstuff material, that preferably flows past the outlet opening of the receiving chamber for the casing material.

A development of the apparatus according to the invention provides that the outlet opening is an annular gap which is arranged concentrically with respect to the housing and which is adapted to deliver the casing material substantially in a radial direction inwardly on to the surface of the string of foodstuff material produced. The configuration of the outlet opening in the form of an annular gap provides that the outer surface of the string of foodstuff material comes into contact with the casing material to be placed thereover, over the entire periphery. The preferably radially inwardly delivered casing material in addition further provides that the string produced from the foodstuff material is better detached in the region of the discharge opening of the stationary housing and thus continuous production of the string of foodstuff material, that is to be produced therefrom, is advantageously further improved.

According to a preferred development of the apparatus according to the invention at its outer surface and/or at its inner surface the rotatable element has projections and/or recesses, for example grooves or roughenings in order to create increased friction with the foodstuff material during the rotational movement. In the end portion of a feed tube, shortly before the outlet at the inside and/or outside thereof or at the outside of a swirling means, it is possible to form or arrange additional structural elements, with which the adhesion of the foodstuff material to the inner or outer surface of the rotatable element is improved. In particular in the transitional region between the outlet or the end of the rotatable element and the stationary housing, this arrangement provides that the foodstuff material performs the desired relative movement with respect to the stationary housing and does not prematurely come away from the surface of the rotatable element by virtue of the binding forces acting within the foodstuff material. It is possible to provide at the outer or inner surface of the feed tube, in the end region, any desired structural element like for example a recess, a roughening or a projection protruding at the surface, in order to ensure the desired static friction between the foodstuff and the feed tube.

A further aspect of the invention concerns an apparatus for processing a foodstuff material, in particular for producing sausage products from sausage meat, comprising a stationary housing which has a wall and which can be connected in fluid-conducting relationship to a conveyor pump and a discharge opening for delivery of the foodstuff material, and a co-extrusion head for delivery of the foodstuff material and a casing material surrounding the foodstuff material, which cooperates with the discharge opening of the housing. According to the invention arranged within the housing is an element for partially swirling the foodstuff material within the housing, which is rotatable relative to the wall and along which in operation at least a partial amount of the foodstuff material to be conveyed flows, and wherein the rotatable element ends within the housing before the discharge opening for delivery of the foodstuff material.

With an apparatus of such a configuration for processing a foodstuff material a string of the foodstuff material is produced, which is enclosed by a casing material, wherein the foodstuff material flowing in the housing is swirled by the rotatable element arranged within the housing, in such a way that the fibers of the foodstuff material are in an orientation different from the conveyor direction of the foodstuff material. In that way it is possible in particular to influence the shrinkage behaviour of the foodstuff material string or a plurality of string portions produced therefrom in the longitudinal direction in a cooking process following the production operation. The rotatable element ends in front of the outlet opening of the housing. This provides that the foodstuff material which is still in the operative region of the rotatable element is moved or swirled relative to the foodstuff material which is moved immediately previously out of the operative region of the rotatable element.

In an embodiment of the present invention the rotatable element can be a bar element arranged within the stationary housing. In particular the central axis of the rotatable element is concentric with the central axis of the stationary housing. According to a preferred development it is possible to arrange at the rotatable element in the form of the bar element, at the peripheral surface thereof, suitable structural elements with which the movement of at least a partial amount of the conveyed foodstuff material within the stationary housing together with the rotating bar element is assisted. The structural elements can be in the form of guide plates or paddles.

In regard to advantageous configurations of the apparatus for processing a foodstuff material in accordance with the second aspect according to the invention attention is directed to the foregoing description relating to the apparatus for processing a foodstuff material according to the first aspect according to the invention.

According to a further aspect the present invention concerns a machine for producing a string from a foodstuff material, in particular a string of sausages, comprising a filling hopper for receiving the foodstuff material, a conveyor pump for producing a conveyor flow of the foodstuff material and an apparatus for processing a foodstuff material, in particular sausage meat, according to one of the above-described preferred embodiments and/or a conveyor machine for conveying casing material, which is coupled in fluid-conducting relationship to an extrusion head of the apparatus.

The machine according to the invention for producing a string, also referred to as a filling machine, attains the object set forth in the opening part of this specification with an apparatus for processing a foodstuff material according to the above-described embodiments, wherein arranged within the housing is an element which is rotatable relative to the wall for partially swirling the foodstuff material within the housing, along which in operation at least a partial amount of the foodstuff material to be conveyed flows, and wherein the rotatable element ends within the housing before the discharge opening for delivery of the foodstuff material. In particular this provides that the fibers within the foodstuff material string produced acquire a non-homogenous orientation which is at least partially different relative to the conveyor direction of the foodstuff material string. In particular the fibers are turned or twisted in a spiral around the longitudinal axis of the sausage string produced. This provides that the string produced or the string of foodstuff material, that is subdivided to give a plurality of string portions, exhibits a markedly reduced shrinkage behaviour in the longitudinal direction of the string portions in a cooking process following production, than conventionally produced string portions, the fibers of which extend at least to a relatively great extent substantially parallel to the longitudinal axis of the string. To subdivide the string produced from the foodstuff material into a plurality of string portions of equal length the machine preferably has a dividing device for subdividing the foodstuff material string which is formed and preferably covered with a casing material. The dividing device has one or more separating blades which are moved into the conveyor path of the string of foodstuff material at predefined spacings. Reference is expressly also made to the description relating to the foregoing aspects of the invention and advantageous effects in relation to the machine according to the invention as set forth here.

Still a further aspect of the present invention concerns a method of producing a string from a foodstuff material, in particular sausage meat, comprising the steps: conveying the foodstuff material in the conveyor direction along a housing by a conveyor pump, during the conveying of the foodstuff material swirling of and preferably producing in addition a rotational movement component on parts of the foodstuff material around the longitudinal axis of the housing by a rotatable element which is arranged within the housing and which ends before a discharge opening of the housing for delivery of the foodstuff material.

With the step of swirling the foodstuff material, preferably creating in addition a rotational movement component at at least parts of the foodstuff material being conveyed, the fibers within the foodstuff material are put into an orientation which is different from the conveyor direction and thus the longitudinal axis of a string to be produced by the foodstuff material. By virtue of the fibers being oriented relative to the longitudinal axis of the string or the subdivided string portions, in a cooking process following the production process, a respective string portion shrinks markedly less in the longitudinal direction thereof than a string portion which is produced in conventional fashion. Accordingly by the method steps according to the invention it is possible to specifically influence the shrinkage behaviour of the string portions in the longitudinal direction and thus also influence the external appearance of the string portions to be produced. Reference is also directed to the foregoing description relating to the apparatus according to the invention, in respect of this aspect of the invention.

According to a preferred configuration the method according to the invention includes one, more of all of the steps recited hereinafter: conveying at least a partial amount of the foodstuff material along the rotatable element, delivering the foodstuff material conveyed in a rotatable feed tube out of an outlet of the rotating feed tube or leaving the operative region of a rotatable swirling means arranged in a stationary feed tube by the foodstuff material into a portion of the stationary housing, producing a substantially spiral-shaped orientation of the foodstuff material flowing along the stationary portion, in particular between the outlet or end of the rotatable element and the discharge opening of the housing, axially conveying a partial amount of the foodstuff material in the conveyor direction through a substantially annular passage provided between the feed tube and the stationary housing, bringing the partial amounts of the foodstuff material together before the discharge opening of the housing, and applying a casing material to the external surface of the foodstuff string, preferably in the region of the discharge opening of the housing using a co-extrusion head.

Preferably the partial amount of the foodstuff material is conveyed continuously along the rotatable element in the form of a swirling means or through the rotatable feed tube. In the case of the design configuration with the rotatable element in the form of a feed tube the foodstuff material is discharged from an outlet of the feed tube into a portion of the stationary housing. With the discharge of the foodstuff material, in which case the foodstuff material is further conveyed in the conveyor direction at the same time and also the rotatable element is moved relative to the stationary housing, a substantially spiral configuration of the structure within the foodstuff material is created. This means that the fibers of the foodstuff material are in a spiral configuration around the longitudinal axis of the string produced. Production of that spiral orientation is effected in particular between the outlet of the feed tube and the discharge opening of the housing. In a configuration in which an annular passage is formed around the feed tube and the stationary housing both the partial amount of the foodstuff material flows through the feed tube and also a partial amount of the foodstuff material flows through the annular passage between the feed tube and the stationary housing. Both partial amounts are then preferably brought together again to form a common foodstuff material, after passing the end of the feed tube. In a further preferred embodiment a casing material is applied to the outside of the string created, shortly before or with the delivery of the foodstuff material from the discharge opening on the stationary housing. Preferably the casing material is applied to the outside surface of the foodstuff string over the entire periphery. The casing material is preferably a hardenable casing material like for example alginate or collegen.

The preferred embodiments and developments described in relation to the apparatus according to the invention are at the same time also preferred embodiments of the machine according to the invention for producing a string or the method of creating a string from a foodstuff material. Configurations described in relation to the machine and the method respectively are at the same time also preferred configurations of the various aspects of the apparatus according to the invention.

BRIEF DESCRIPTION OF THE DRAWINGS

The features and advantages of the invention will be appreciated upon reference to the following drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
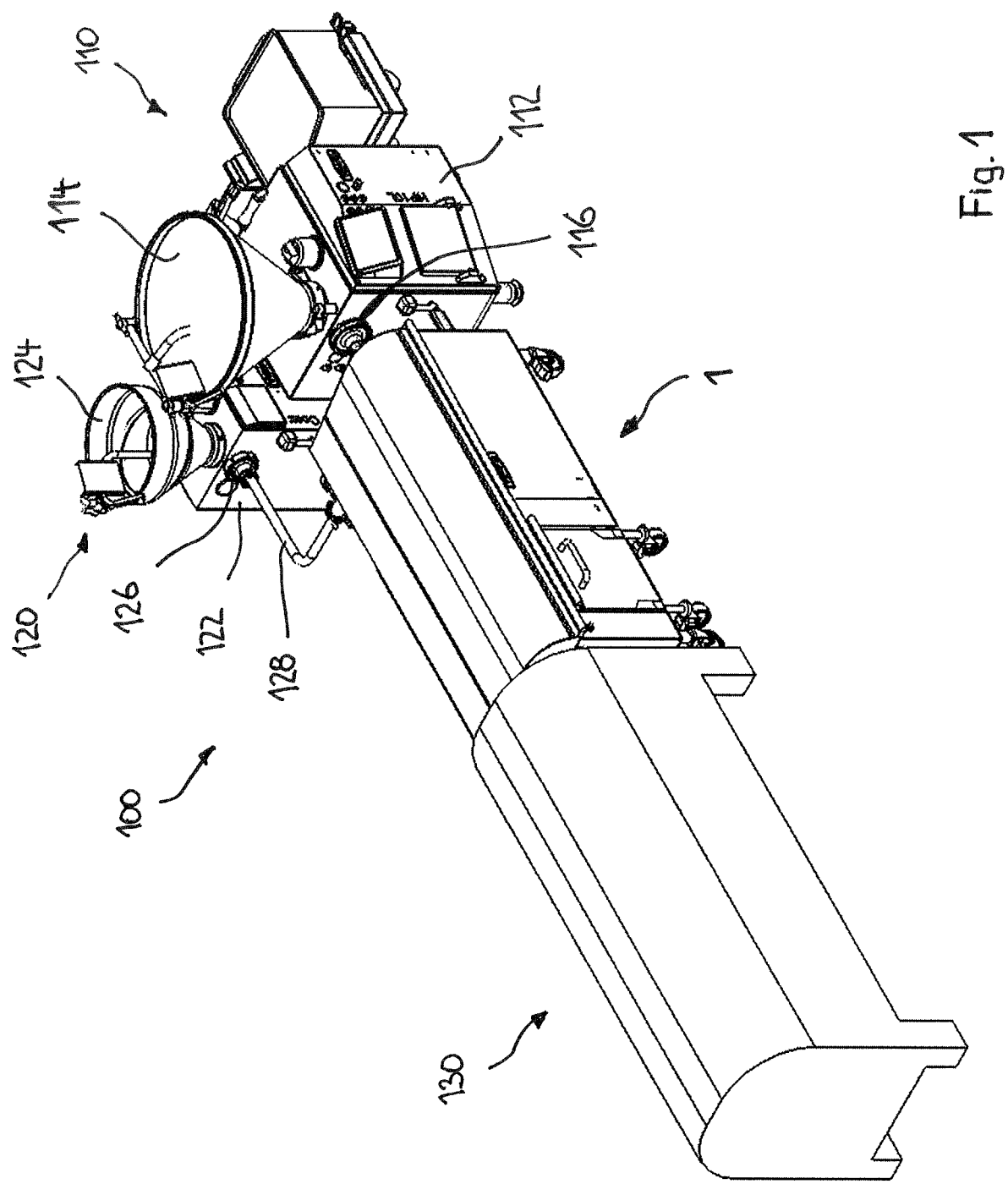
FIG. 1 is a perspective view of a machine for producing a string from a foodstuff material with an apparatus according to one embodiment of the invention and an apparatus for further processing.
Figure 2:
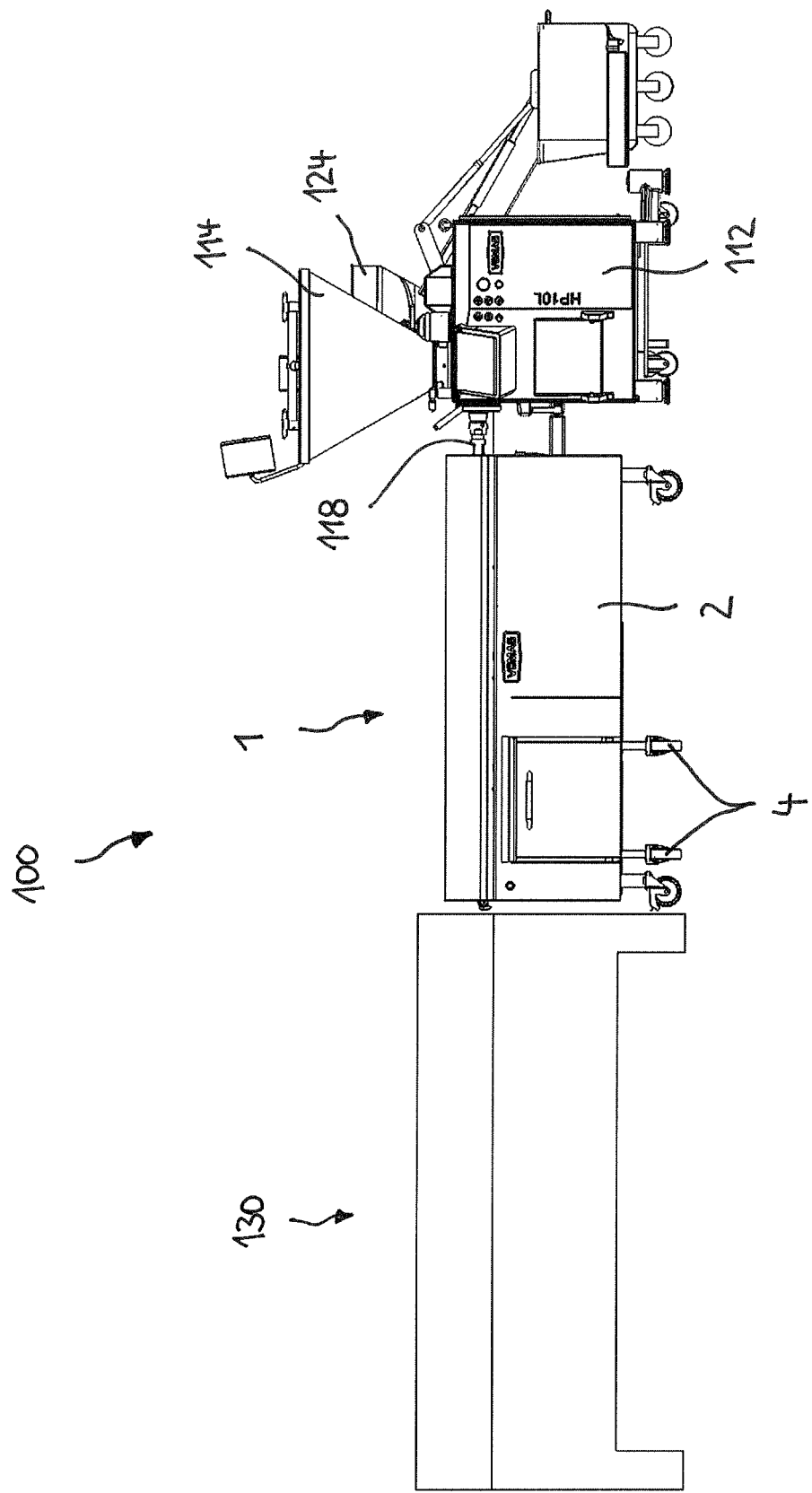
FIG. 2 is a front view of the machine shown in FIG. 1.

FIGS. 1 and 2 show a machine 100 for producing a string from a foodstuff material like sausage meat or the like. The machine 100 includes a filling machine 110, by which the foodstuff material which is in the form of a raw material is processed to afford a continuously conveyed string. The filling machine 110 includes a housing 112 and a filling hopper 114 arranged on the housing 112 for introducing the foodstuff material to be processed. A conveyor device (not shown in detail) is provided within the filling machine 110. The foodstuff material is conveyed in the direction of a filling machine connection 116 at the filling machine 110 by the conveyor device which in an embodiment is in the form of a conveyor pump. The filling machine 110 is connected by way of a connecting conduit 118 to the apparatus 1 according to the invention for processing the foodstuff material.

The machine 100 further includes a conveyor machine 120 which is of a similar design configuration to a filling machine for a casing material for enclosing the foodstuff material, comprising a housing 122 and a filling hopper 124 arranged at the housing. The filling hopper 124 is adapted to receive the casing material to be applied to the outside of the string to be created. For example alginate or collagen is used as the casing material. A conveyor mechanism (not shown in detail) is arranged within the housing 122. The casing material is drawn out of the filling hopper 124 and put under pressure by the conveyor mechanism. The conveyor mechanism which can be in the form of a conveyor pump conveys the casing material in the direction of the apparatus 1 for processing the foodstuff material, by way of a conveyor machine connection 126 and a connecting conduit 128 connected thereto.

As FIGS. 1 and 2 further show the apparatus 1 for processing the foodstuff material is arranged immediately downstream of the filling machine 110 in the conveyor direction of the foodstuff material, that by way of the connecting conduit 118 receives the string of foodstuff material that is being conveyed continuously or also cyclically. The casing material for the string to be produced in contrast is fed to the apparatus 1 from a longitudinal side.

The apparatus 1 includes a displaceable frame 2, at the underside of which are arranged rollers 4. The foodstuff material or the string produced therefrom is processed by the apparatus 1. In the present case a casing material is applied to the outside of the preferably continuously conveyed foodstuff material string by the apparatus 1. The casing material is preferably solidified on the outside of the string by using a liquid additive material. In an embodiment subdivision of the foodstuff material string into individual string portions is effected by the apparatus 1 itself or by a further processing device 130 connected downstream of the apparatus 1. In particular individual sausages are successively separated from a preferably continuously conveyed string of sausages. The apparatus 1 provides in particular for influencing the structure of the foodstuff material string produced and thus in particular the shrinkage behaviour thereof. That has a particularly advantageous effect on a cooking process subsequent to production of the string portions.

Figure 3:
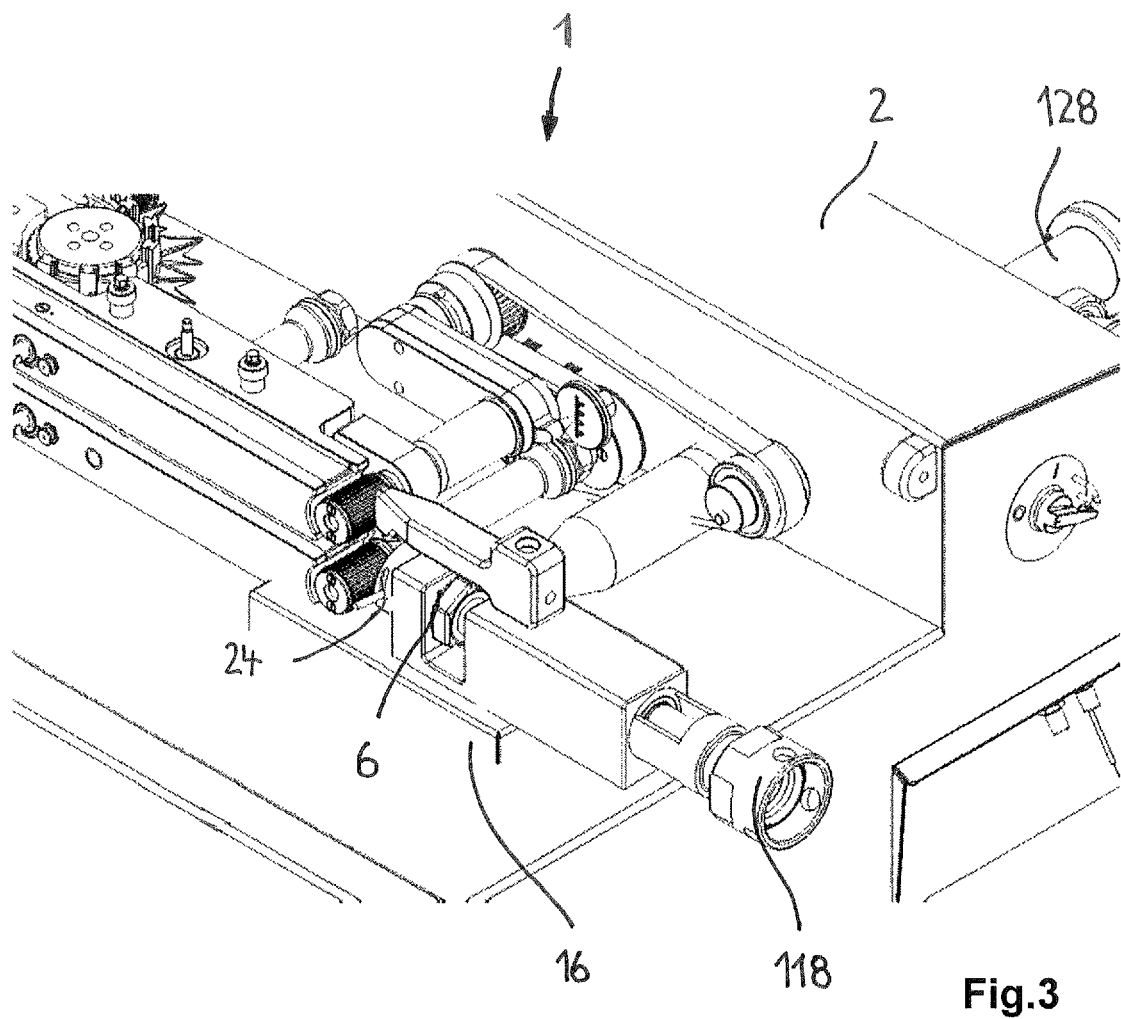
FIG. 3 is a perspective view of the apparatus for processing the foodstuff material.

FIG. 3 shows a detail view of the apparatus 1 according to the invention for processing the foodstuff material. Arranged on the frame 2 of the apparatus 1 is a housing 6, 6' having a stationary wall 8, which housing can be connected in fluid-conducting relationship to the conveyor pump (not shown) of the filling machine 110. The housing 6 has a discharge opening 10 (see FIGS. 4 and 5) for delivery of the foodstuff material string 11 (FIG. 4) from the apparatus 1. Arranged within the stationary housing 6, 6' is an element 12 which is rotatable relative to the wall 8 for partially swirling the foodstuff material within the housing 6.

In an embodiment of the invention the rotatable element 12 is in the form of a rotatably mounted, preferably drivable feed tube, through which in operation at least a partial amount of the foodstuff material to be conveyed flows. In addition the rotatable element 12 ends within the housing 6 before the discharge opening 10 thereof for delivery of the foodstuff material. The rotatable element 12 extending in the direction of its longitudinal axis therefore does not extend to the discharge opening but maintains a spacing relative thereto so that a partial space 17 (FIG. 4) is formed within the housing 6 between the end of the rotatable element 12 and the discharge opening. In operation foodstuff material preferably flows into that partial space 17 which is preferably somewhat enlarged.

In a preferred design in which the rotatable element 12 is in the form of a feed tube the outlet 14 thereof ends at a spacing before the discharge opening 10 of the housing 6 with its stationary wall 8. According to a preferred embodiment the spacing between the discharge opening of the housing and the outlet of the feed tube is in the range of >0 through about 50 mm. This provides that the foodstuff material is moved less or is no longer moved by the rotatable element 12 in the region between its end and the discharge opening 10 of the housing 6, that is to say the partial space 17. In that partial space 17 in the housing 6 the foodstuff material is moved primarily in the axial direction of the stationary housing.

Figure 4:
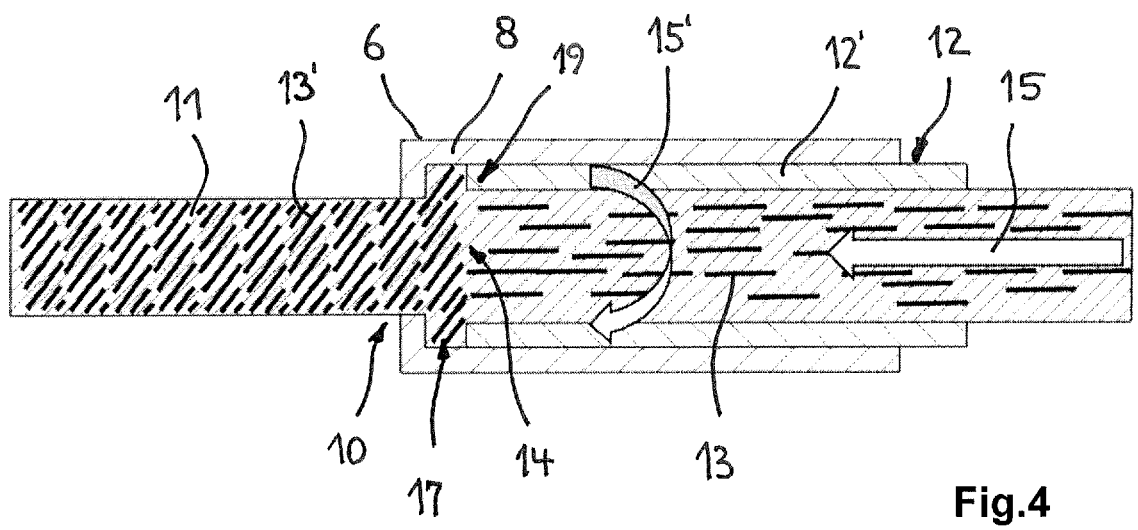
FIG. 4 is a simplified view illustrating one mode of operation of the apparatus.
Figure 5:
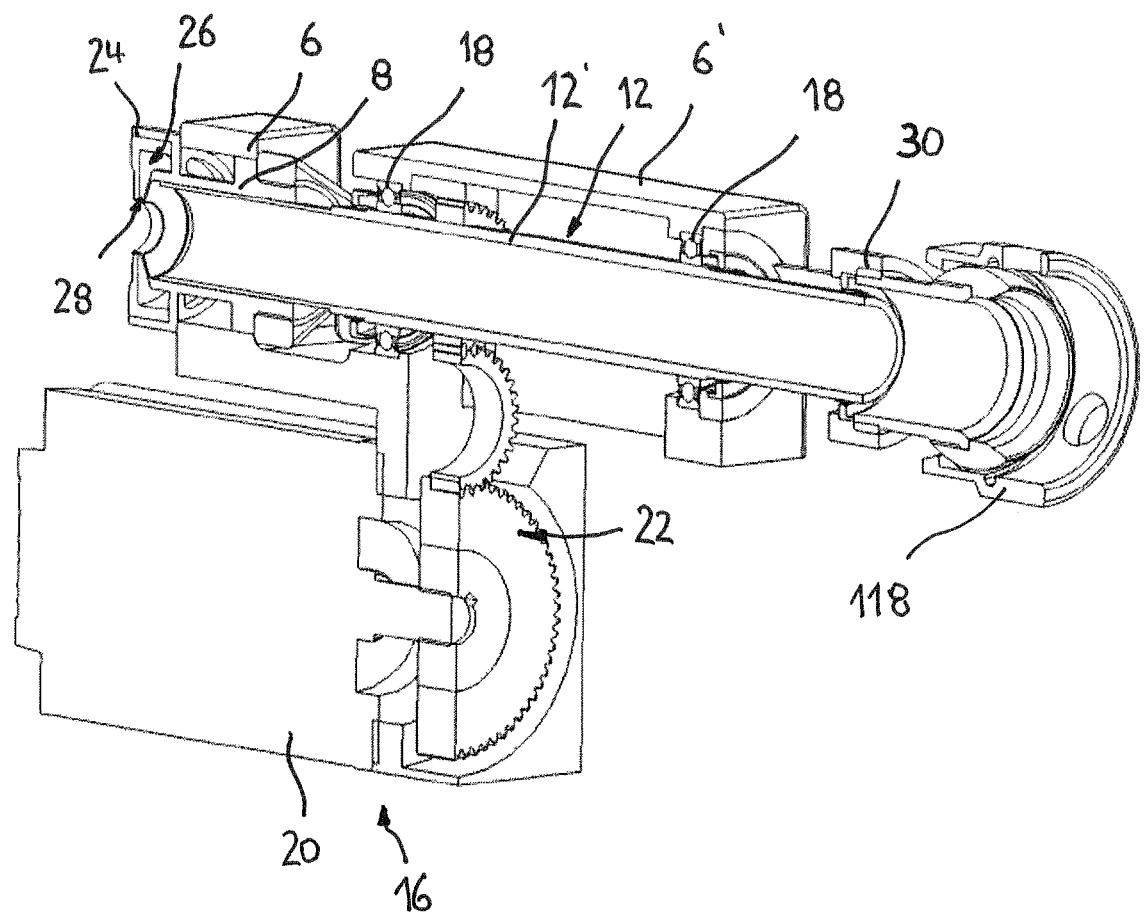
FIG. 5 is a perspective view in cross section of the apparatus.

As can be seen by way of example from FIGS. 4 and 5 a rotatable element 12 in the form of the feed tube is arranged concentrically within the housing 6. The rotatable element 12 is carried rotatably on the housing 6' by two rotary bearings 18 and is caused to rotate or driven in rotation relative to the stationary housing 6, 6' by a drive unit 16. The rotatable element 12 is adapted to displace at least a partial amount of the foodstuff material to be conveyed, when flowing through the housing 6, in its longitudinal direction, in addition in a movement involving at least one rotational movement component relative to the longitudinal axis of the housing 6.

It will be apparent from FIG. 4 that, specifically at the transition from the end region 19 of the rotatable element into the stationary housing 6 and into the partial space 17 thereof the arrangement provides that the structure of the foodstuff material flowing between the discharge opening 10 of the housing 6 and the outlet 14 of the rotatable element 12 acquires a more non-homogenous, preferably partially or substantially spiral orientation by virtue of the conveyor movement of the foodstuff material in the conveyor direction (arrow 15) and the rotational movement (arrow 15') of the feed tube 12 relative to the stationary housing 6. Within the feed tube 12 the fibers 13 of the foodstuff material being conveyed are still oriented parallel in the conveyor direction of the foodstuff material. After the foodstuff material issues from the outlet 14 of the feed tube or when it passes over from the operative region of the rotatable element 12 into the housing 6 with its stationary wall 8, the fibers 13' of the foodstuff material are oriented differently. After leaving the discharge opening 10 on the housing 6 the string 11 of foodstuff material has fibers 13' which are oriented in a more non-homogenous fashion and which for example are oriented at least partially or substantially in a spiral form around the longitudinal axis of the stationary housing 6.

In an embodiment which is not shown in greater detail, in operation of the apparatus according to the invention, the foodstuff material flows coaxially both through the rotatable feed tube and also through a substantially annular passage formed between the feed tube and the housing. The inside diameter of the housing can be in a ratio in the range of >1 through about 2 relative to the outside diameter of the rotatable element. A portion of the housing 6 can involve a flow cross-section which reduces in the conveyor direction of the foodstuff material.

Figure 6:
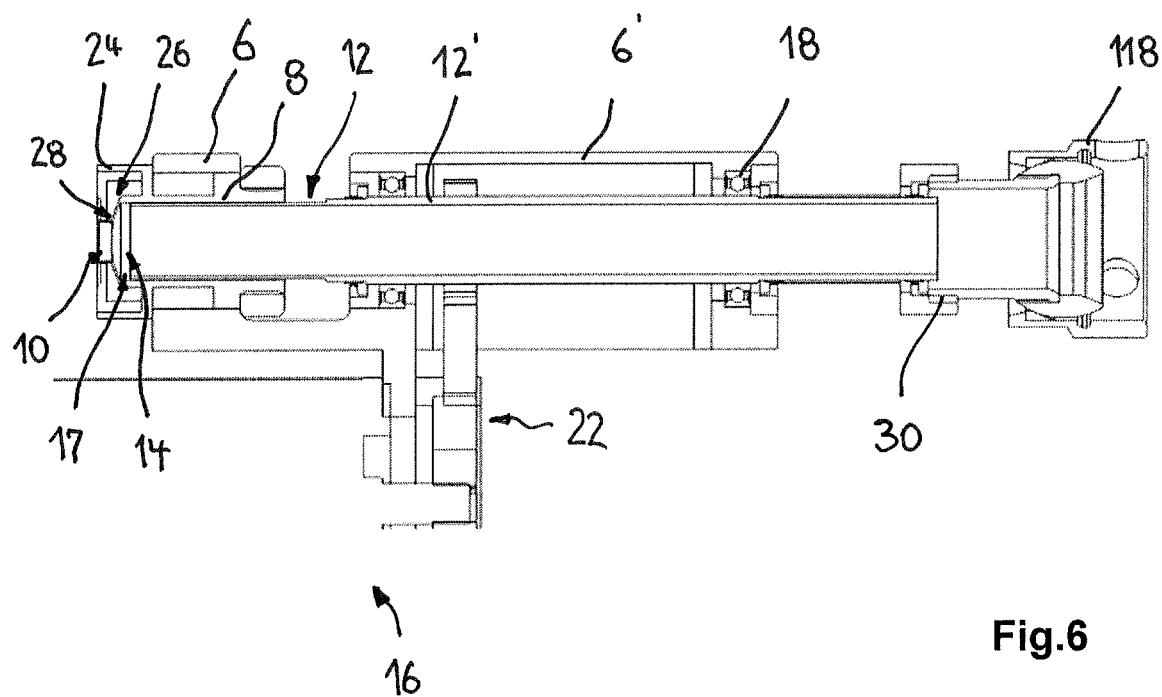
FIG. 6 is a front view in cross section of the apparatus of FIG. 5.

The rotatable element 12, in the present case the feed tube shown in FIGS. 5 and 6, is of a substantially constant flow cross-section over its entire length. The drive unit, by way of a control device (not shown) coupled thereto of the apparatus, is adapted to cause the rotatable element to rotate in a continuous adjustable rotary movement. As can be seen from FIG. 5 the drive unit 16 has an electric motor 20 which by way of a transmission gear 22 transmits the rotary movement produced by the electric motor to the rotatable element 12. The feed tube 12 is coupled to the connecting conduit 118 of the filling machine 110 by way of a coupling portion 30.

As can also be seen from FIGS. 5 and 6 the housing 6 has an extrusion head 24 for discharge of the string of foodstuff material. Besides the discharge of the foodstuff material the extrusion head 24 is also adapted to apply a casing material to the outside of the string produced from the foodstuff material. In the illustrated embodiment the extrusion head 24 is in the form of a co-extrusion head.

The extrusion head 24 is preferably stationarily mounted fixedly to the machine frame 2 of the apparatus according to the invention. The extrusion head 24 has a receiving chamber 26 for the casing material to be applied to the outside of the string of foodstuff material. The casing material is a flowable but hardenable casing material like for example alginate or collagen.

The receiving chamber 26 for the casing material of the extrusion head 24 has an outlet opening 28 associated in particular with the discharge opening 10 of the housing 6 for delivery of the foodstuff material. In that way the flowable casing material is applied directly to the surface of the discharged string. In particular the outlet opening 28 is in the form of an annular gap, by way of which the casing material is delivered substantially inwardly in a radial direction on to the surface of the string produced.

Figure 7:
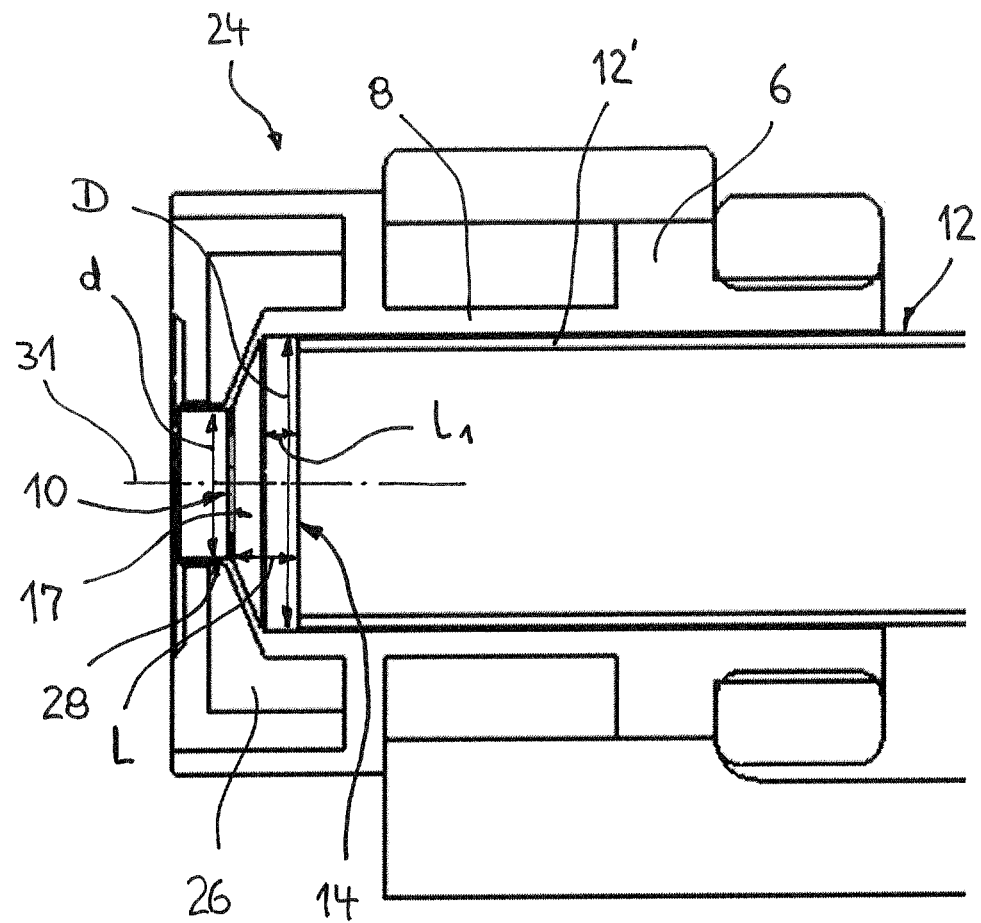
FIG. 7 is a detail view of an extrusion head arranged at the discharge opening of the apparatus.

FIG. 7 shows the extrusion head 24 as a detail view in the region of the discharge opening 10 of the apparatus 1 according to the invention (FIG. 3) which is in the form of a co-extrusion head. The housing 6 of the apparatus 1 forms parts of the extrusion head 24, the rotatable element 12 being in the form of a feed tube for foodstuff material. The rotatable element 12 is moveable relative to the wall 8 within the housing 6. In the present case the rotatable element 12 rotates about the central axis 31 of the stationary housing 6.

The outlet 14 of the feed tube 12 ends at a spacing in front of the discharge opening 10 of the stationary housing 6. A partial space 17 is formed between the end of the rotatable element 12 in the form of the feed tube and the end of the stationary housing. The partial space 17 is of a length L and a diameter D.

In the preferred embodiment the diameter D of the partial space 17 remains the same over a portion of its length L and is larger than the outside diameter of the element 12 which is rotatably carried in the housing and which here is preferably in the form of the feed tube 12. Preferably, over a portion of the length L of the partial space 17, the diameter narrows conically in the direction of the discharge opening 10. The diameter d at the discharge opening 10 is about 50% of the diameter D of the partial space 17 in the transitional region from the rotatable element 12 to the stationary housing 6. The partial length $l_1$ of the partial space 17 with its diameter D which remains the same is about half the overall length L of the partial space 17.

The discharge opening 10 of the stationary housing 6 is directly adjoined by the outlet opening 28 of the receiving chamber 26 for the casing material which is to be applied to the outside of the string produced from the foodstuff material. In the illustrated configuration the outlet opening 28 for the casing material involves a radial orientation.

Figure 8:
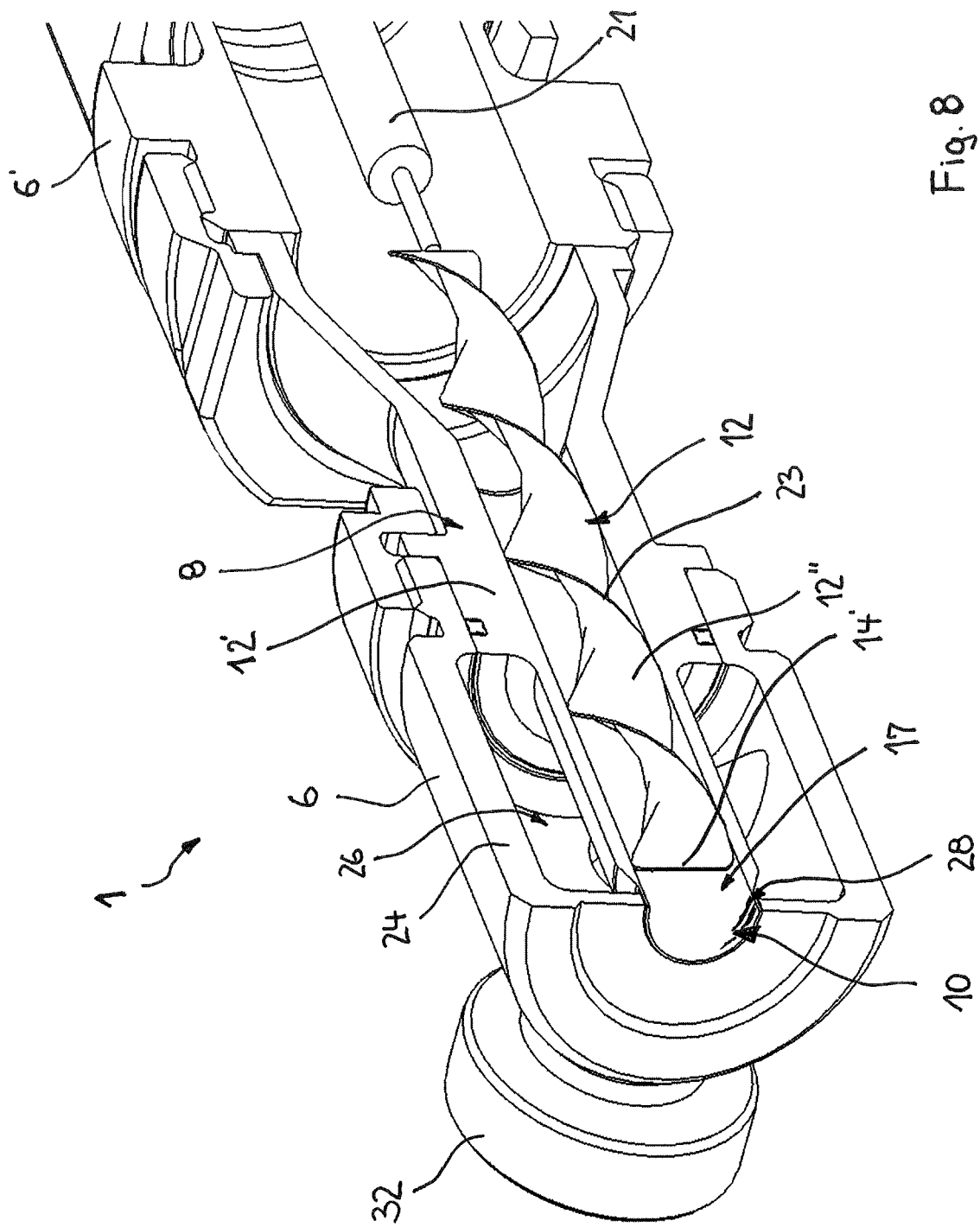
FIG. 8 is a perspective view in cross section of the apparatus according to a second embodiment.

FIG. 8 shows a second embodiment of an apparatus 1 according to the invention, having a housing 6, 6'. The housing 6 includes a stationary wall 8 which in the illustrated configuration is in the form of a stationary feed tube 12'. A rotatable element 12 is arranged within the stationary feed tube 12'. The rotatable element 12 is a swirling means 12" which is arranged at a bar element 21 disposed rotatably in the housing 6', and extends in the direction of the discharge opening 10 of the stationary housing 6.

In the illustrated embodiment the swirling means 12" is a spiral 23. The foodstuff material which is conveyed through the stationary feed tube 12' is caused to perform a movement with an additional rotatry movement component, by the spiral 23. The rotatable element 12 in the form of the swirling means 12" has an end 14' which ends at a spacing before the discharge opening 10 on the stationary housing 6. The spiral 23 is of an outside diameter slightly less than the inside diameter of the stationary feed tube 12'.

The swirling means 12" does not have the function of conveying the foodstuff material through the stationary housing 6 in the longitudinal direction. The second embodiment of the apparatus 1 according to the invention also has a partial space 17, within which the foodstuff material is caused to move with at least a rotational movement component. The swirling means 12" is accommodated coaxially within the feed tube 12', the cross-section of which narrows conically along a portion, and is moveable relative to the wall 8.

An extrusion head 24 as part of the housing 6 of the apparatus 1 is arranged in the region of the discharge opening 10 of the stationary feed tube 12'. The extrusion head 24 is fixedly mounted to the machine frame 2 of the apparatus 1. The extrusion head 24 has a receiving chamber 26 for the casing material to be applied to the outside of the string of foodstuff material. The extrusion head 24 has a casing material inlet 32 for the casing material supplied to the extrusion head 24, which is connected in fluid-conducting relationship to the conveyor machine connection 126 of the conveyor machine 120 (FIG. 1) for the casing material. The extrusion head 24 also has an outlet opening 28 associated in particular with the discharge opening 10 on the housing 6. The outlet opening 28 is an annular gap directed in a radial direction towards the surface of the foodstuff material string produced.

In an alternative preferred embodiment the rotatable element at its outer surface and/or in the configuration in the form of the feed tube, at its inner surface, has projections and/or recesses to create increased friction between the surface of the rotatable element 12 and the foodstuff material being conveyed.

In an alternative embodiment (not shown) the rotatable element, instead of being in the form of the feed tube, is in the form of a bar element which at its outer peripheral surface has a plurality of guide elements or paddles. During operation of the apparatus according to the invention for producing a string from the foodstuff material the foodstuff material is conveyed in the conveyor direction along the housing 6 having the stationary wall by a conveyor pump (not shown). During the conveying movement in the conveyor direction a rotational movement component about the longitudinal axis of the housing is additionally created on parts of the foodstuff material being conveyed through the stationary housing. In that case the production of the rotational movement component on the parts of the foodstuff material is concluded before reaching the discharge opening on the housing 6. In that way a substantially spiral orientation of the structure or the fibers of the foodstuff material is created within the foodstuff material in the transitional region between the rotatable element and the following portion of the stationary housing.

With the discharge of the string of foodstuff material from the stationary housing a casing material is applied to the outside of the foodstuff material string, thereby causing consolidation at the surface of the string.

In operation the following method of producing a string from a foodstuff material, in particular sausage meat, is performed:

conveying the foodstuff material in the conveyor direction 15 along a housing 6 by a conveyor pump;

during the conveying operation producing in addition a rotational movement component on parts of the foodstuff material around the longitudinal axis of the housing by a rotatable element 12 which is arranged within the housing 6 and which ends before a discharge opening 10 of the housing for delivery of the foodstuff material.

Optionally the following more specific steps can additionally be carried out:

conveying at least a partial amount of the foodstuff material along the rotatable element 12, preferably by a rotatable feed tube delivering the foodstuff material conveyed in the feed tube out of an outlet of the rotating feed tube into a portion of the stationary housing, producing a substantially spiral-shaped orientation of the structure of the foodstuff material flowing along the stationary portion, in particular between the outlet and the discharge opening of the housing, axially conveying a partial amount of the foodstuff material in the conveyor direction through a substantially annular passage provided between the feed tube and the stationary housing, bringing the partial amounts of the foodstuff material together before the discharge opening of the housing, and applying a casing material to the external surface of the foodstuff string, preferably in the region of the discharge opening of the housing using a co-extrusion head.

The embodiments described above are descriptions of preferred embodiments of the present invention, and are not intended to limit the scope of the present invention. Various variations and modifications can be made by those of ordinary skill in the art, without departing from the design and scope of the present invention. The variations and modifications should all fall within the claimed scope defined by the claims of the present invention.

LIST OF REFERENCES

1 apparatus
2 machine frame
4 rollers
6, 6' housing
8 wall
10 discharge opening
11 foodstuff material string
12 rotatable element
12' feed tube
12" swirling means
13, 13' fibers
14 outlet
14' end
15 conveyor direction
15' rotational movement
16 drive unit
17 partial space
18 rotary bearing
19 end region
20 electric motor
21 bar element
22 transmission gear
23 spiral
24 extrusion head
26 receiving chamber
28 outlet opening
30 coupling portion
31 central axis
32 casing material inlet
L long partial space
$L_1$ partial length
D diameter partial space
d diameter discharge opening
100 machine
110 filling machine
112 housing
114 filling hopper
116 filling machine connection
118 connecting conduit
120 conveyor machine
122 housing
124 filling hopper
126 conveyor machine connection
128 connecting conduit
130 further processing device

What is claimed is:

1. An apparatus for producing a string with a substantially cylindrical outer contour from a foodstuff material, comprising:

a stationary housing which has a wall and which can be connected in fluid-conducting relationship to a conveyor pump, and has a discharge opening for delivery of the foodstuff material, wherein arranged within the housing is a rotatable element for partially swirling the foodstuff material within the housing, which is rotatable relative to the wall, the rotatable element ends within the housing before the discharge opening for delivery of the foodstuff material, the rotatable element is a feed tube, through which in operation at least a partial amount of the foodstuff material flows, and the feed tube within the stationary housing is of a substantially constant flow cross-section for delivery of a string having a substantially cylindrical outer contour.

2. The apparatus of claim 1, wherein a spacing between the discharge opening of the housing and an outlet or end of the rotatable element is in a range of >0 mm through about 100 mm and the rotatable element is arranged concentrically within the housing.

3. The apparatus of claim 1, wherein the rotatable element is set in rotation by a drive unit and is adapted to additionally move at least a partial amount of the foodstuff material to be conveyed when flowing through the housing in a longitudinal direction in a movement with at least one rotational movement component relative to a longitudinal axis of the housing.

4. The apparatus of claim 3, wherein the rotatable element is adapted to orient substantially in a spiral shape a structure of the foodstuff material flowing in a portion of the housing between its discharge opening and an outlet or end of the rotatable element by virtue of relative movement between a feed tube and the stationary housing.

5. The apparatus of claim 1, wherein a substantially annular passage is formed between the feed tube and the housing.

6. The apparatus of claim 5, wherein an inside diameter of the housing is in a ratio ranging from >1 through about 2 relative to an outside diameter of the rotatable feed tube.

7. The apparatus of claim 1, wherein the housing has a portion with a flow cross-section decreasing in a conveyor direction of the foodstuff material.

8. The apparatus of claim 1, wherein the rotatable element is coupled to a drive unit which is adapted to displace the rotatable element in a continuous adjustable rotary movement.

9. The apparatus of claim 1, wherein the housing cooperates with an extrusion head for the delivery of a string of the foodstuff material, and
wherein the extrusion head is a co-extrusion head for delivery of the foodstuff material and a casing material surrounding the foodstuff material.

10. The apparatus of claim 9, wherein the co-extrusion head is supported stationarily by a machine frame and has a receiving chamber for the flowable, hardenable casing material, which includes alginate or collagen.

11. The apparatus of claim 10, wherein the receiving chamber has an outlet opening which is associated with the discharge opening of the housing so that the flowable casing material is delivered directly on to a surface of the foodstuff material.

12. The apparatus of claim 11, wherein the outlet opening is an annular gap which is arranged concentrically with respect to the housing and which is adapted to deliver the casing material substantially in a radial direction inwardly on to the surface of the string of foodstuff material produced.

13. The apparatus of claim 1, wherein at one or more of its outer surface and its inner surface, the rotatable element has projections and/or recesses to create increased friction with the foodstuff material during rotational movement.

14. A machine for producing a string from a foodstuff material, comprising:
a filling hopper for receiving the foodstuff material,
a conveyor pump for producing a conveyor flow of the foodstuff material,
the apparatus (1) for processing a foodstuff material of claim 1, and
a dividing device for subdividing the foodstuff string which is formed and which is covered with a casing material into individual mutually separated string portions and/or a conveyor machine coupled in fluid-conducting relationship to an extrusion head of the apparatus.

15. A method of producing a string with a substantially cylindrical outer contour from a foodstuff material, comprising the steps:
conveying the foodstuff material in a conveyor direction along a housing by a conveyor pump;
during a conveying operation producing in addition a rotational movement component on parts of the foodstuff material around a longitudinal axis of the housing by a rotatable element which is arranged within the housing and which ends before a discharge opening of the housing for delivery of the foodstuff material,
wherein the rotatable element is a feed tube, through which in operation at least a partial amount of the foodstuff material flows, and
the feed tube within the stationary housing is of a substantially constant flow cross-section for delivery of a string having a substantially cylindrical outer contour.

16. The method as set forth in claim 15, further comprising one or more of all the steps:
conveying at least a partial amount of the foodstuff material along the rotatable element,
delivering the foodstuff material conveyed in a rotatable feed tube out of an outlet of the rotating feed tube or leaving an operative region of rotatable swirling means arranged in a stationary feed tube by the foodstuff material into a portion of the stationary housing,
producing a substantially spiral-shaped orientation of a structure of the foodstuff material flowing along the stationary portion, between the outlet or end of the rotatable element and the discharge opening of the housing,
axially conveying a partial amount of the foodstuff material in a conveyor direction through a substantially annular passage provided between the feed tube and the stationary housing,
bringing the partial amounts of the foodstuff material together before the discharge opening of the housing, and
applying a casing material to an external surface of the foodstuff string, in a region of the discharge opening of the housing using a co-extrusion head.

* * * * *